United States Patent
Yoon

(10) Patent No.: US 7,007,989 B2
(45) Date of Patent: Mar. 7, 2006

(54) BACK BEAM STRUCTURE OF AUTOMOBILE BUMPER

(75) Inventor: Byung Kyu Yoon, Ansan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/867,855

(22) Filed: Jun. 15, 2004

(65) Prior Publication Data

US 2004/0256868 A1 Dec. 23, 2004

(30) Foreign Application Priority Data

Jun. 19, 2003 (KR) ...................... 10-2003-0039796

(51) Int. Cl.
*B60R 19/03* (2006.01)
(52) U.S. Cl. ...................... 293/120; 293/122; 293/146
(58) Field of Classification Search ................ 293/120, 293/122, 146, 148, 151, 149, 152, 155; 52/731.6, 52/735.1
See application file for complete search history.

(56) References Cited

U.S. PATENT DOCUMENTS

| | | | | |
|---|---|---|---|---|
| 3,901,543 A | * | 8/1975 | Norlin | 293/122 |
| 5,545,022 A | * | 8/1996 | Rosasco | 425/110 |
| 5,934,544 A | * | 8/1999 | Lee et al. | 228/146 |
| 6,240,820 B1 | * | 6/2001 | Sturrus et al. | 83/188 |
| 6,510,771 B1 | * | 1/2003 | Sturrus et al. | 83/54 |
| 6,591,576 B1 | * | 7/2003 | Iida et al. | 52/731.6 |
| 6,592,158 B1 | * | 7/2003 | Kettler et al. | 293/120 |
| 6,684,505 B1 | * | 2/2004 | Sundgren et al. | 29/897.2 |
| 6,726,261 B1 | * | 4/2004 | Goto et al. | 293/120 |

FOREIGN PATENT DOCUMENTS

JP 2002-087186 3/2002

* cited by examiner

*Primary Examiner*—Patricia L. Engle
(74) *Attorney, Agent, or Firm*—Morgan Lewis & Bockius LLP

(57) ABSTRACT

A back beam structure of an automobile bumper in which the back beam is shaped to have the predetermined spaces respectively on top and bottom by bending one panel many times so that both ends of the panel meet at the front center of the back beam. The ends of the panel meeting at the front center of the back beam are bent to a round shape so that they contact the inner surface of the rear side of the panel. Multiple brackets are installed in intervals connecting the upper and lower parts of the back beam at the front side of the back beam.

16 Claims, 3 Drawing Sheets

BACK BEAM STRUCTURE OF AUTOMOBILE BUMPER

CROSS-REFERENCE TO RELATED APPLICATIONS

This application claims priority of Korean Application No. 10-2003-0039796, filed Jun. 19, 2003, the disclosure of which is incorporated fully herein by reference.

FIELD OF THE INVENTION

The present invention relates to a back beam structure of an automobile bumper, and more specifically, to a back beam structure in which the back beam is produced by folding one panel, with the seams of the panel connected by brackets, and a reinforcing member being separately installed at the center of the back beam.

DESCRIPTION OF THE RELATED ART

Generally, the automobile bumpers are installed at the front and rear of an automobile to protect not only the car body and passengers but also the hood, the engine mounted in the engine room and various devices.

The bumper also should meet the impact requirements required by the laws of various countries and have high stiffness and excellent impact resistance in a wide range of temperatures. The expansion and contraction caused by temperature change should be low. The bumper is generally composed of a facia forming the outer cover of the bumper, an energy absorbing member which maintains the shape of the bumper, mitigates the impact and restores the shape at collision, and a back beam which supports the energy absorbing member and absorbs the energy at collision through elastic deformation and plastic deformation.

A conventional back beam structure is configured to have enclosed spaces on top and bottom. Such formation of enclosed spaces increases the stiffness by increasing the section modulus with the same space. After the panel is shaped by bending to form two enclosed spaces on top and at bottom, the back beam is completed by welding the sections where the panels contact each other as a final step.

However, the conventional back beam structure has a problem in that it is finished by welding the sections connecting both ends after one is shaped by bending and thus a separate welding process is needed in the back beam shaping process, which causes a longer processing time. The conventional back beam structure is weak at the center of the back beam, which suffers the highest impact at car collision and thus the central section is severely deformed as the impact energy is concentrated on the central section.

SUMMARY OF THE INVENTION

The present invention simplifies the back beam shaping work by connecting the ends of the panel shaped by bending using multiple brackets rather than connecting them by welding and also increases the overall stiffness of the back beam by bending both ends of the panel to be round in shape and to locally reinforce the central section of the back beam.

In preferred embodiments of the present invention a back beam structure of an automobile bumper comprises a back beam shaped to have predetermined spaces respectively on top and at bottom by bending or folding one panel many times so that both ends of the panel meet at the front center of the back beam. Both ends of the panel meeting at the central section of the back beam are bent in rounded shapes so that they contact the inner surface of the rear side of the panel and multiple brackets are installed in intervals connecting the upper and lower parts of the back beam at the front side of the back beam.

Preferably, a reinforcing member, in which the upper and lower parts protrude forward in a bulging shape with the space between the upper and lower parts being concave in shape, is installed on the front center of the said back beam to combine the upper and lower parts of the back beam and reinforce the central section.

In an alternative embodiment of the invention, a back beam structure for an automobile bumper comprises a main panel and plural brackets. The main panel is bent around itself to form upper and lower parts that define voids. A concave space opens towards a rear of the beam structure between the upper and lower parts. The ends (edges) of the panel are brought together and bent in opposite rounded shapes to contact an inner surface of the rear facing concave space. The pural brackets join the upper and lower parts mounted on a front of the beam structure and spaced at intervals. Preferably, a reinforcing member is secured to a front central section of the main panel between the upper and lower parts. More preferably, the reinforcing member is formed with upper and lower forward protrusions separated by a central, concave forward space. Also, the upper and lower parts may have upper and lower surfaces, respectively, that are bent outwardly.

In an alternative embodiment, the ends of the panel that is folded into the back beam do not come into contact but are spaced a slight distance apart from each other and from the center section of the back beam.

A method for forming a back beam structure for an automobile bumper forms a further alternative embodiment of the invention. In such an exemplary method, a sheet of metal is bent to form upper and lower parts defining substantially rectangular voids with the parts being separated by a rear facing concave open section. The upper and lower parts are joined along a bottom side of the concave open section. The ends of the sheet of metal are joined along an inner surface of the bottom side of the concave open section. The ends of the sheet of metal are also formed in oppositely curved shapes wherein bottoms of the curves lie in contact and a horizontal seam is formed along a front surface of the beam structure. The upper and lower parts are secured together across the seam with plural, spaced apart brackets. An additional, alternative step may comprise securing a reinforcing member to a front central section of the beam structure between the upper and lower parts. Another embodiment of the invention comprises a back beam structure for an automobile bumper made according to the steps of the disclosed method.

DETAILED DESCRIPTION OF THE PREFERRED EMBODIMENTS

Figure 1:
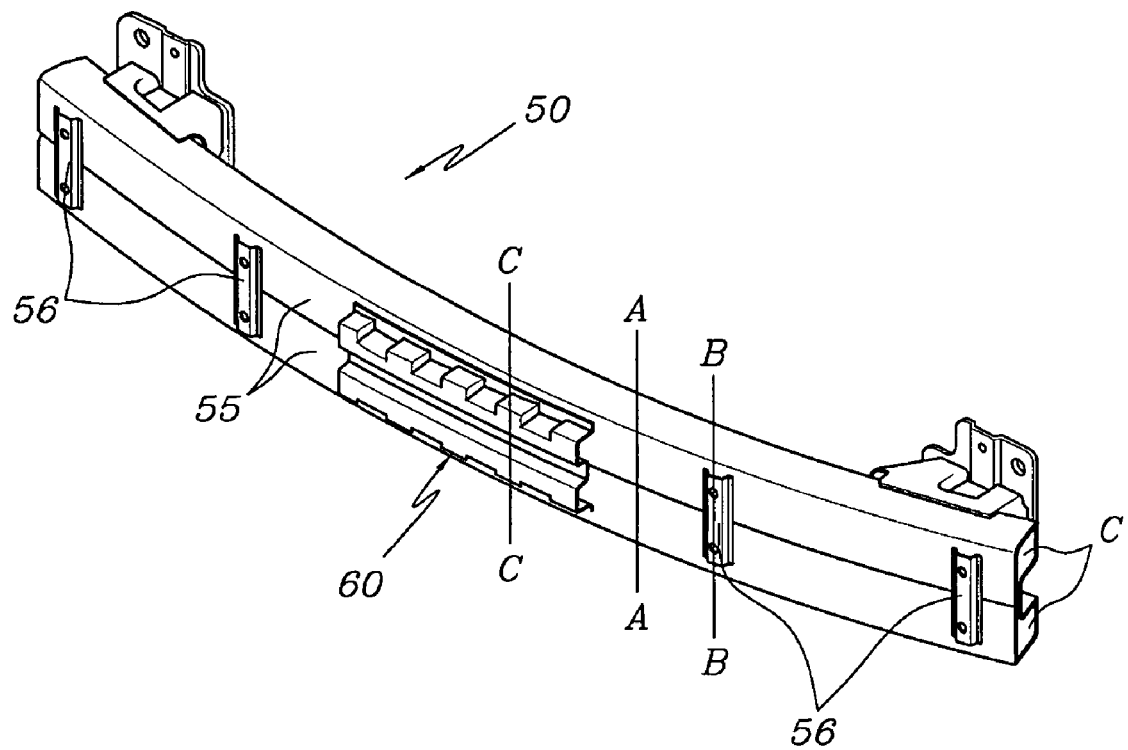
FIG. 1 is the slant view showing the back beam structure of an automobile bumper of the present invention.
Figure 2:
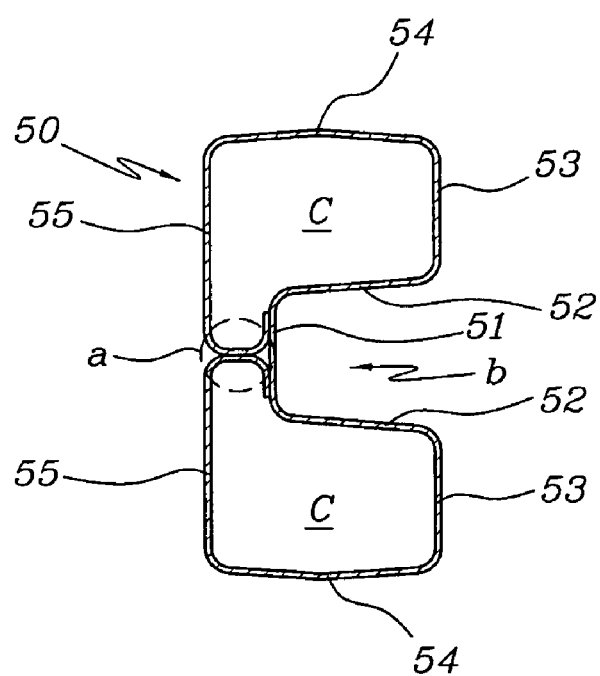
FIG. 2 is a cross-sectional view along the line A—A of FIG. 1.

As shown in the drawings, a back beam (50) according to an embodiment of the present invention has a structure in which one panel is shaped by bending it many times to form certain enclosed spaces (C) at the upper and lower parts. Both ends of the panel meet at the front center (a) of the back beam (50). A rear central part (b) of the back beam (50) has a concave shape, whereas the enclosed spaces (C) are formed in the upper and lower parts of the back beam (50) In the illustrated embodiment, the concave shape in the rear center of the back beam is web (51); the part connected from the web (51) horizontally is the sidewall (52); the part connected from the sidewall (52) vertically is the first wall (53); and the part connected from the first wall (53) horizontally toward the front is the outer sidewall (54). The part connected from the outer sidewall (54) vertically forming the front side of the back beam (50) is the second wall (55) and both ends of the second wall (55) are shaped to meet each other at the front center (a) of the back beam (50).

Both of the ends of the panel which meet at the front center (a) of the back beam, namely both ends of the second wall (55) are bent in a round shape, like a half circle, and placed to contact the inside of the rear part of the panel, namely the inside of the web (51). Here, shaping both ends of the panel to be round shaped by bending, preferably by roll forming, provides a section modulus that increases causing the stiffness to increase and thus the ability to withstand external energy increase.

Multiple brackets (56) are installed in intervals at the front side of the back beam (50) in order to connect the upper second wall (55) and the lower second wall (55) of the back beam (50) in the state that both ends of the panel, namely both ends of the second wall (55) are not combined.

Figure 3:
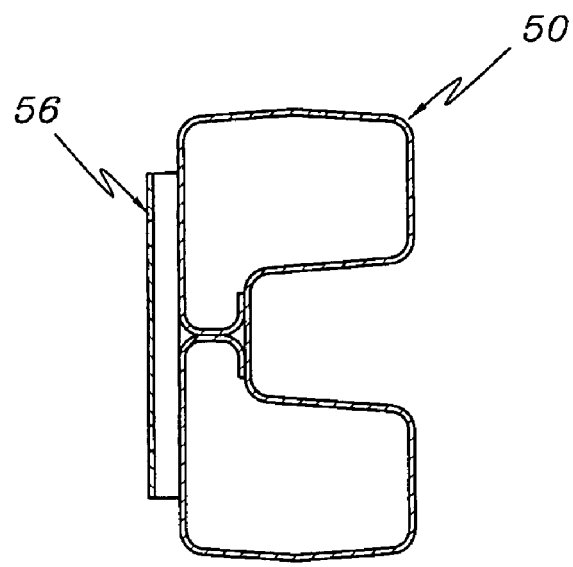
FIG. 3 is a cross-sectional view along the line B—B of FIG. 1.

Preferably, the brackets (56) installed in intervals as shown in FIG. 1 connect and combine the front upper lower parts of the back beam (50) as shown in FIG. 3.

Figure 4:
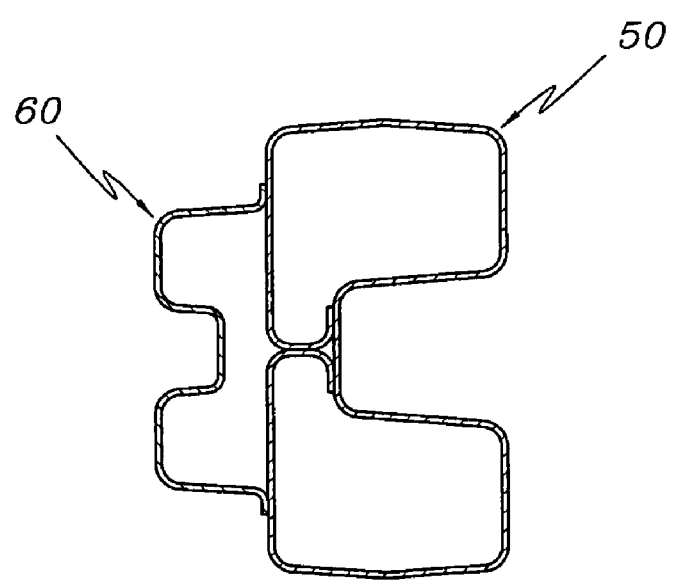
FIG. 4 is a cross-sectional view along the line C—C of FIG. 1.

The reinforcing member (60) is preferably installed in the front center of the said back beam (50) as shown in FIG. 1 to combine the front upper and lower parts of the back beam (50) and also locally reinforce the relatively weak central part of the back beam (50). The reinforcing member (60) has a structure in which the upper and lower parts protrude forward in bulging shape and the space between the upper and lower parts protruding forward in bulging shape is concave in shape as shown in FIG. 4.

Figure 6:
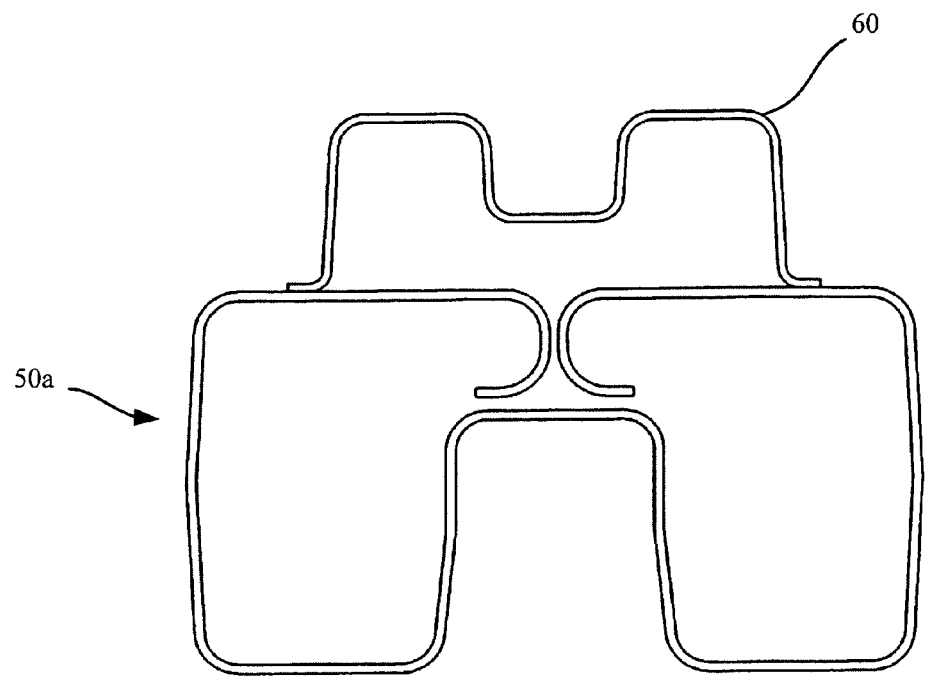
FIG. 6 is a cross-sectional view along line C—C of FIG. 1, also showing an alternative embodiment.
Figure 5:
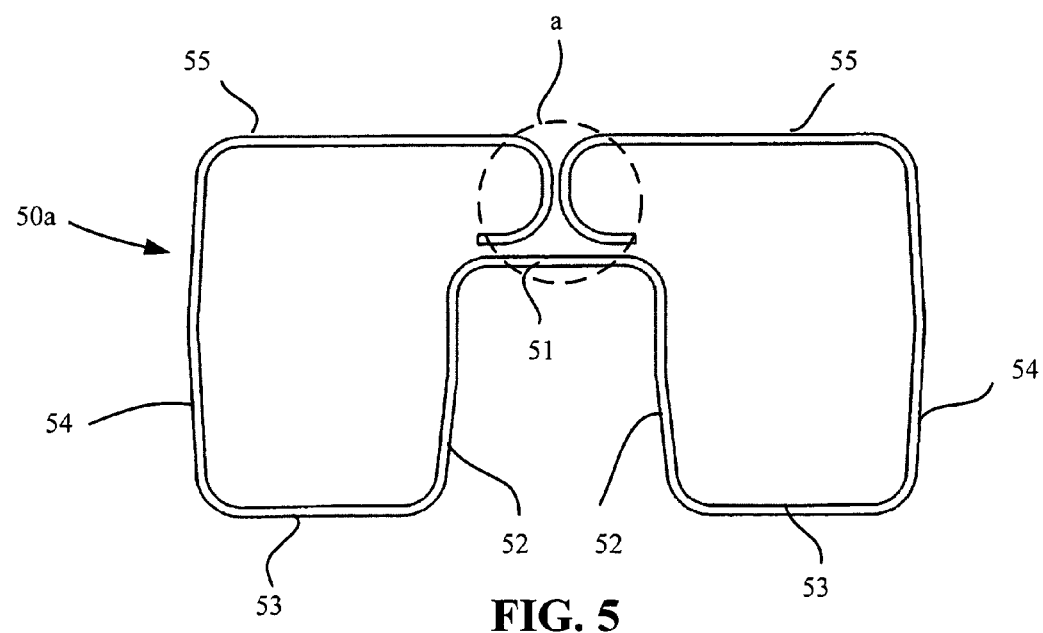
FIG. 5 is a cross-sectional view along line A—A of FIG. 1 showing an alternative embodiment.

In an alternative embodiment of the invention, as shown in FIGS. 5 and 6, at area (a) the edges of the panel are bent into close proximity to each other and to the back side of the center section 51, but do not actually contact. This provides small gaps between the ends and center section that can facilitate painting and finishing operations.

The back beam of the present invention with a structure as described makes the process of forming the back beam (50) much simpler as the panel welding work is removed in this process and also the thermal deformation due to welding is not required as the panel is directly welded.

The strength at the center of the back beam that was relatively weak in the conventional technology is greatly improved by welding the multiple brackets (56) in intervals to combine the front upper and lower parts of the back beam after the forming process of the back beam (50) has been completed and installing the reinforcing member (60) at the center separately.

As described in detail, according to the back beam structure of an automobile bumper of the present invention, the process of forming the back beam becomes simpler and the thermal deformation of the panel does not happen as the panel welding work is removed in the process forming the back beam using one panel. The strength of the back beam is also locally improved by separately installing the reinforcing member at the center of the back beam, where the strength is relatively weak.

What is claimed is:

1. A back beam structure for an automobile bumper, comprising:
    a main panel bent around itself to form upper and lower parts defining voids therein and a concave space opening towards a rear of the beam structure between said upper and lower parts, wherein ends of said panel are brought together and bent in opposite rounded shapes in close proximity to an inner surface of the rear facing concave space; and
    plural brackets joining the upper and lower parts mounted on a front of the beam structure spaced at intervals.

2. The back beam structure of claim 1, further comprising a reinforcing member secured to a front central section of the main panel between the upper and lower parts.

3. The back beam structure of claim 2, wherein said reinforcing member is formed with upper and lower forward protrusions separated by a central, concave forward space.

4. The back beam structure of claim 2, wherein plural brackets are spaced at intervals on each side of the reinforcing member.

5. The back beam structure of claim 1, wherein the upper and lower parts have upper and lower surfaces, respectively, that are bent outwardly.

6. The back beam structure of claim 1, wherein the ends of the panel contact each other and said inner surface of the rear facing concave space.

7. The back beam structure of claim 1, wherein the ends of the panel are spaced apart by small gaps from each other and from said inner surface of the rear facing concave space.

8. The back beam structure of claim 1, wherein said back beam structure has squared ends.

9. The back beam structure of claim 8, wherein said ends are formed in back-to-back C shapes with a leg of each C shape forming a portion of a wall of the back beam structure and an opposite leg of each C shape being disposed within one said void.

10. The back beam structure of claim 9, wherein said C shapes are in contact and said opposite leg of each C shape contacts the inner surface of the rear facing concave space.

11. The back beam structure of claim 9, wherein said C shapes are spaced apart and said opposite leg of each C shape is spaced from the inner surface of the rear facing concave space.

12. A back beam structure for an automobile bumper made according a process, comprising:
    bending a sheet of metal to form upper and lower parts defining substantially rectangular voids with said parts being separated by a rear facing concave open section and joined along a bottom side of the concave open section;
    bringing ends of the sheet of metal into close proximity along an inner surface of said bottom side of the concave open section;
    forming the ends of the sheet of metal in oppositely curved shapes wherein bottoms of said curves lie in close proximity and a horizontal seam is formed along a front surface of the beam structure; and securing the upper and lower parts together across said seem with plural, spaced apart brackets.

13. The back beam structure of claim 12, wherein said bringing and forming steps comprise:
   joining ends of the sheet of metal an inner surface of said bottom side of the concave open section; and
   forming the ends of the sheet of metal in oppositely curved shapes wherein bottoms of said curves lie in contact.

14. A back beam structure for an automobile bumper, comprising:
   a main panel bent around itself to form upper and lower parts defining voids therein and a concave space opening towards a rear of the beam structure between said upper and lower parts, wherein ends of said panel are brought together and bent in oppositely formed C shapes in close proximity to an inner surface of the rear facing concave space;
   a reinforcing member secured to a front central section of the main panel between the upper and lower parts; and
   plural brackets spaced at intervals on each side of the reinforcing member mounted on a front of the beam structure joining the upper and lower parts.

15. The back beam structure of claim 14, wherein said C shapes are in contact and a leg of each C shape contacts the inner surface of the rear facing concave space.

16. The back beam structure of claim 14, wherein said C shapes are spaced apart and a leg of each C shape is spaced from the inner surface of the rear facing concave space.

* * * * *